No. 746,829. PATENTED DEC. 15, 1903.
J. C. HAGEY & O. H. ARNO.
ORGAN.
APPLICATION FILED JULY 21, 1902.
NO MODEL. 7 SHEETS—SHEET 1.

WITNESSES: INVENTORS:

No. 746,829. PATENTED DEC. 15, 1903.
J. C. HAGEY & O. H. ARNO.
ORGAN.
APPLICATION FILED JULY 21, 1902.
NO MODEL. 7 SHEETS—SHEET 4.

No. 746,829.

Patented December 15, 1903.

UNITED STATES PATENT OFFICE.

JAMES CLARKE HAGEY AND OLIVER H. ARNO, OF BOSTON, MASSACHUSETTS.

ORGAN.

SPECIFICATION forming part of Letters Patent No. 746,829, dated December 15, 1903.

Application filed July 21, 1902. Serial No. 116,391. (No model.)

*To all whom it may concern:*

Be it known that we, JAMES CLARKE HAGEY and OLIVER H. ARNO, citizens of the United States, residing at Boston, in the county of Suffolk and State of Massachusetts, have invented a new and useful Improvement in Organs, of which the following is a full, clear, and exact description, reference being had to the accompanying drawings, forming a part of this specification, in explaining its nature.

The invention is to some extent based upon that described in our application for Letters Patent of the United States, Serial No. 83,448, filed November 23, 1901, and is especially adapted for use in organs or similar musical instruments having one or two manuals. In the said application we have described an organization by which an organ having a number of manuals may be automatically played and may also be manually played, and we have also described means whereby in an organ of this character having a number of divisions and manuals the automatic playing mechanism may be actuated to play individualized notes upon any of the divisions while accompaniment notes are being played upon the same or other divisions.

Our present invention, while it employs to a considerable extent the automatic means for governing the automatic playing of individual and accompaniment notes, varies from the invention of the application with respect to the arrangement of the reeds or pipes and the way in which they are combined with the automatic playing means and also with the hand playing means. This organization permits the organ to have any range as to the kind and number of pipes or reeds employed, while at the same time a simpler operating mechanism is secured and one that is somewhat more direct and less expensive to build.

We will now describe the invention in conjunction with the drawings forming a part of this specification, wherein—

Figure 1:
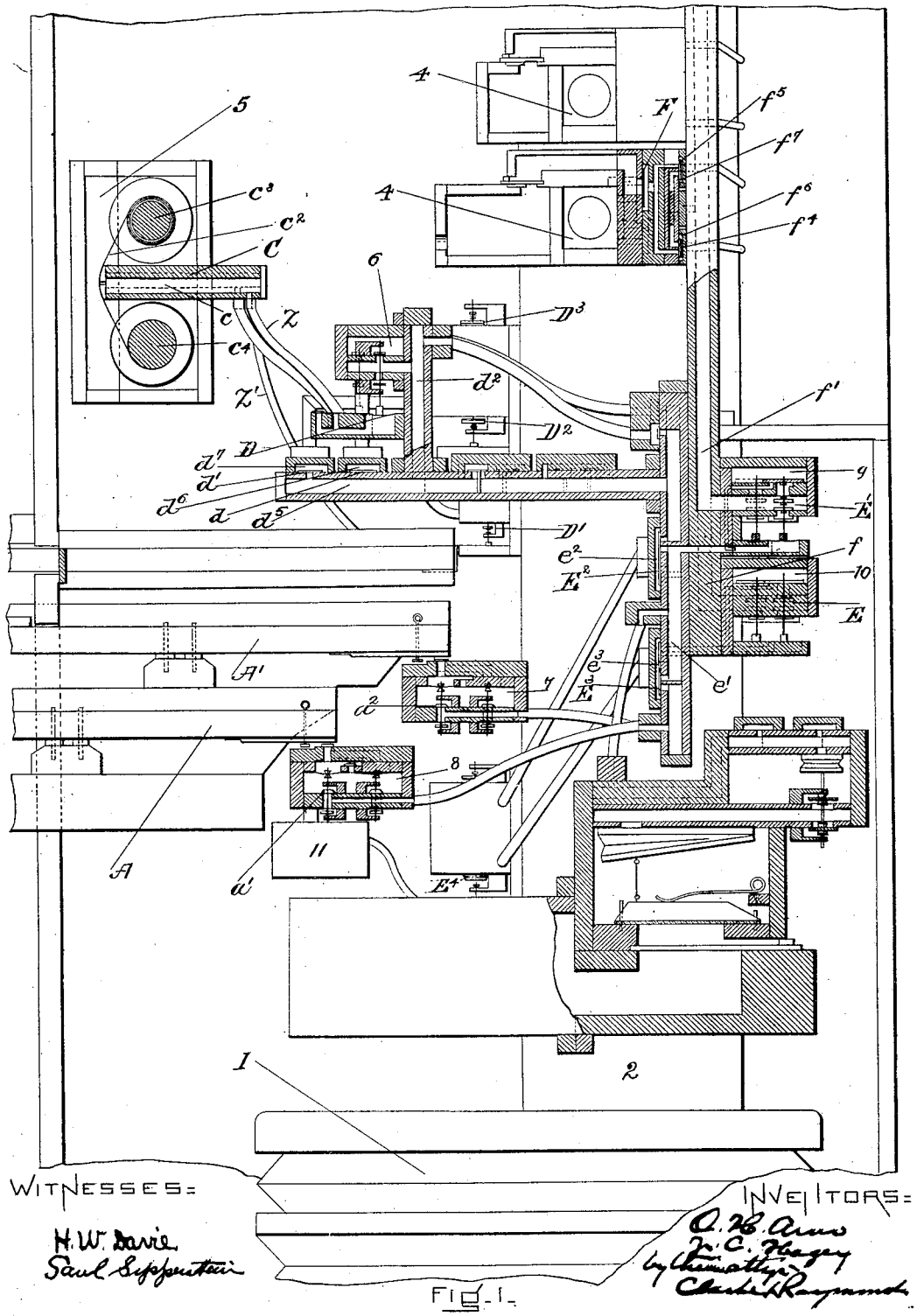
Figure 2:
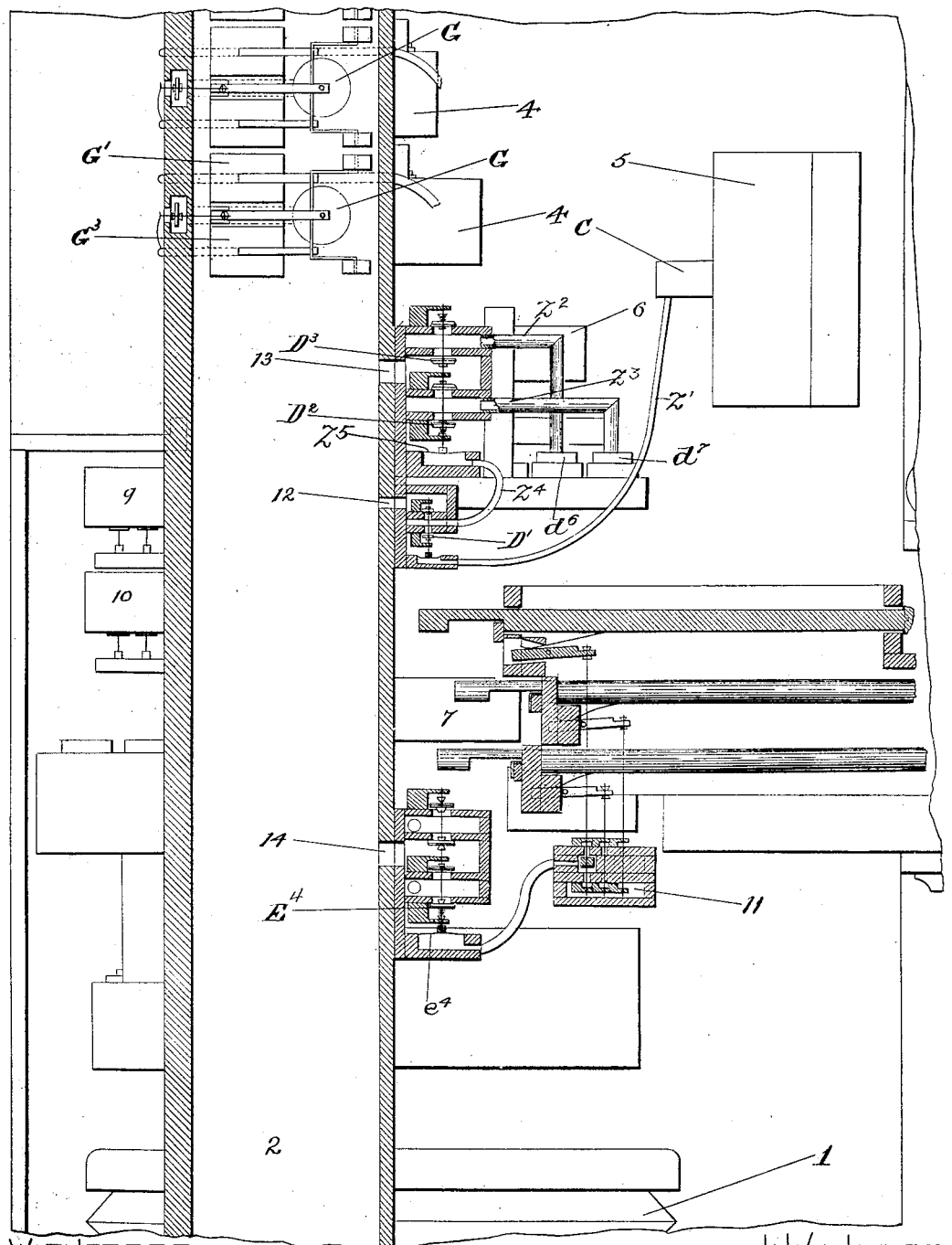
Figure 3:
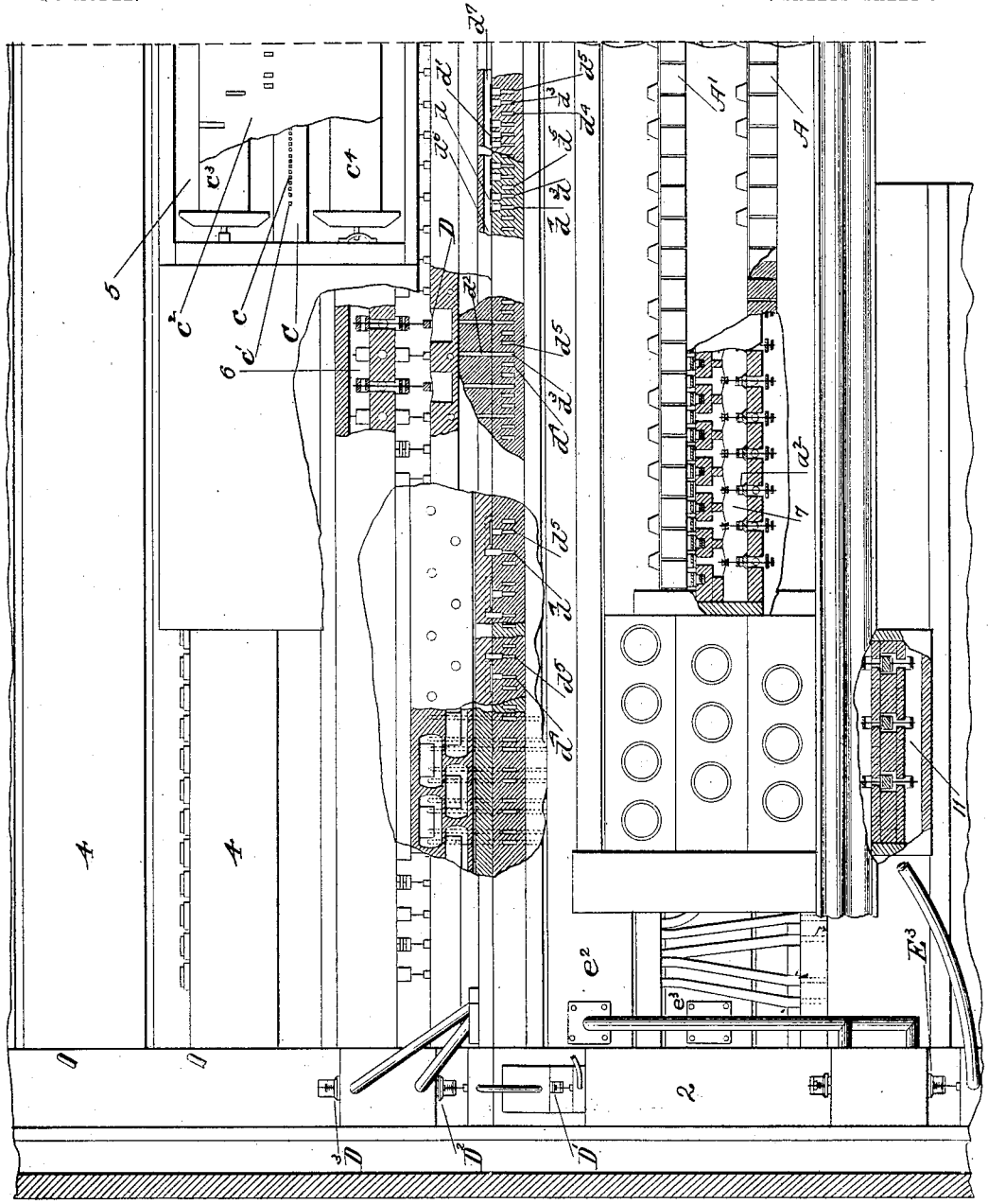
Figure 4:
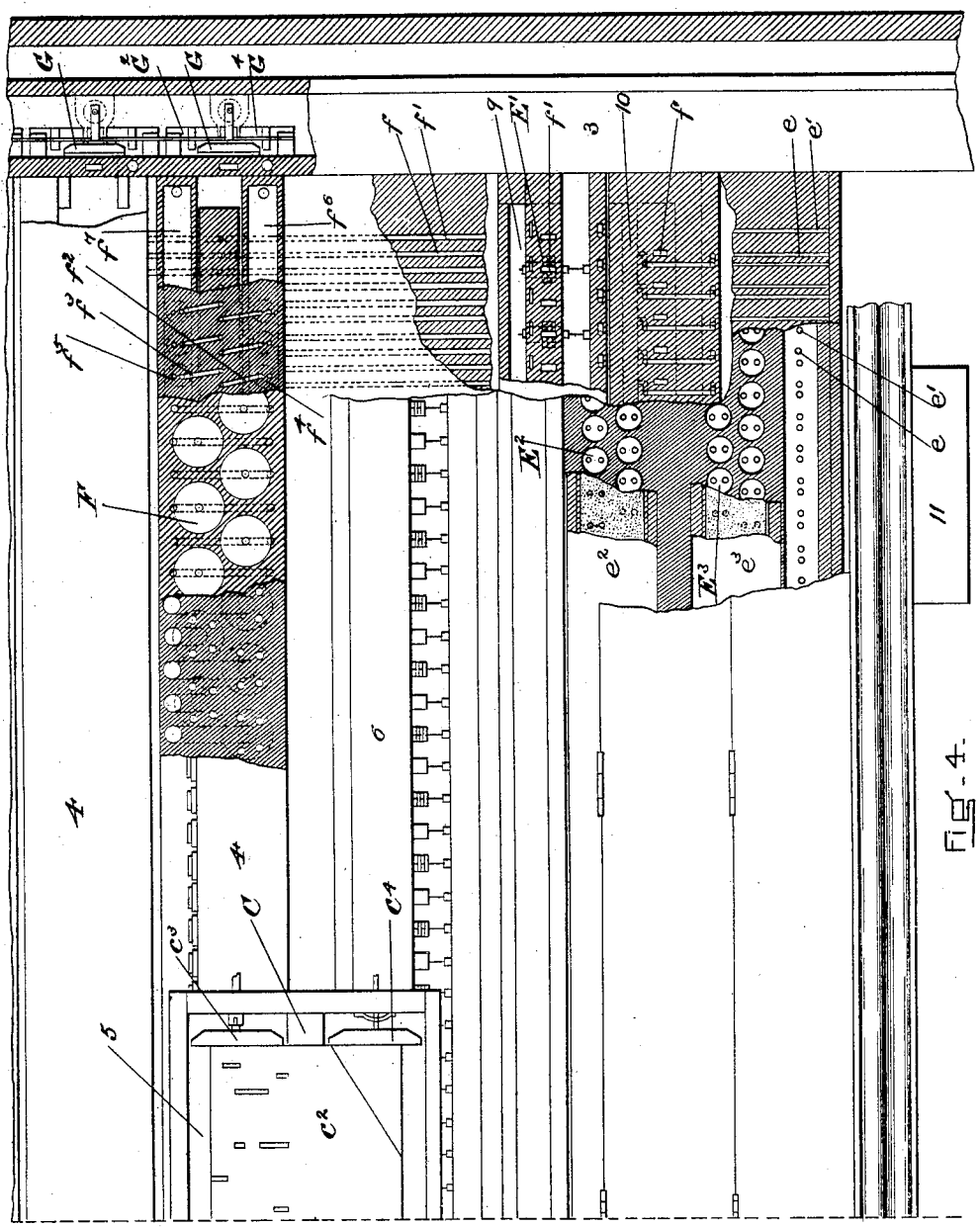
Figure 5:
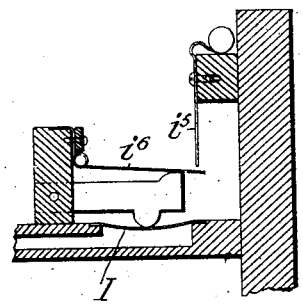
Figure 6:
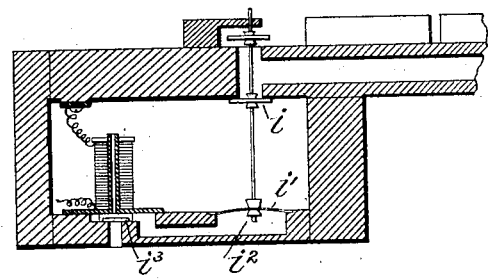
Figure 7:
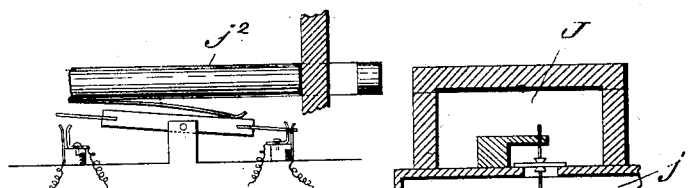
Figure 8:
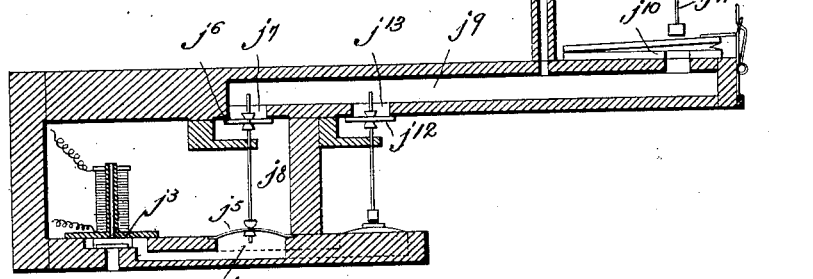
Figure 9:
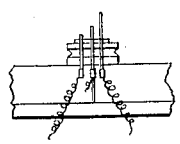
Figure 10:
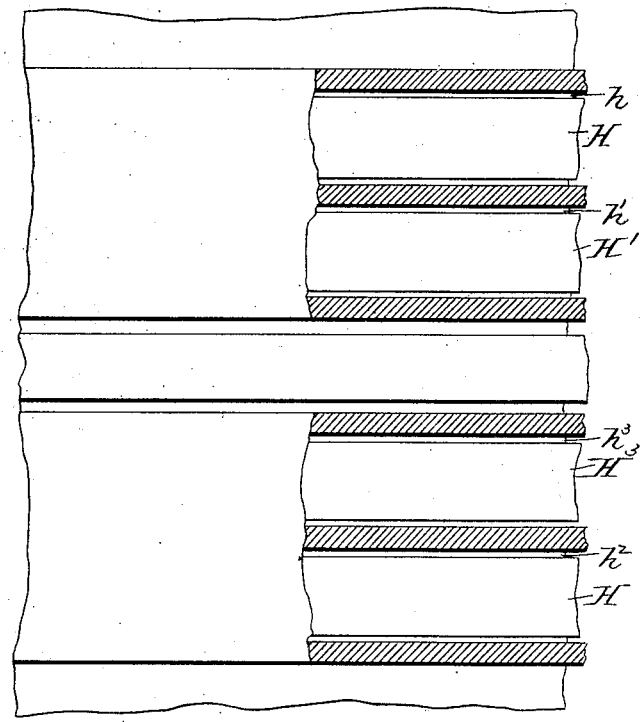
Figure 14:
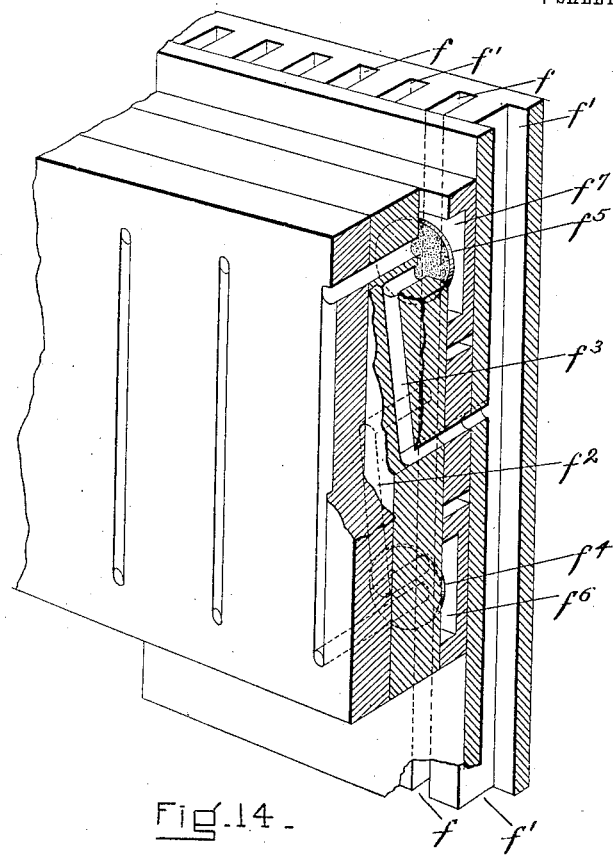
Figure 15:
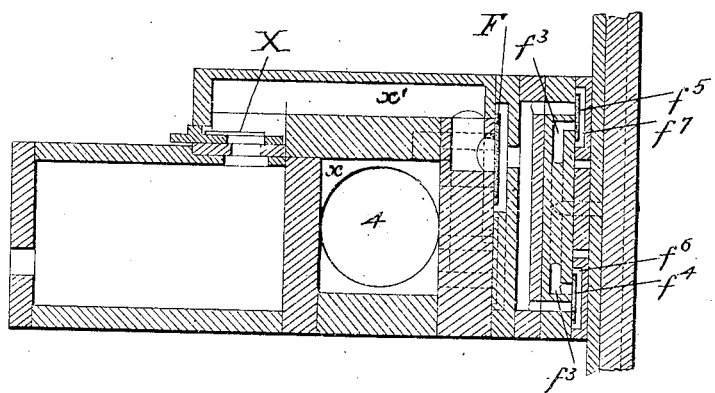

Figure 1 is a view, partly in elevation and partly in vertical section, of enough of an organ to show the main parts of our invention. Fig. 2 is a view, partly in left elevation and partly in vertical section, at the left end of the instrument, showing features of the invention to which reference will hereinafter be made. Fig. 3 is a view, partly in front elevation, of the left end or bass half of the instrument, a portion being removed to better show the construction. Fig. 4 is a view, partly in front elevation, of the right-hand or treble half of the instrument, a portion being removed to show the construction. Fig. 5 is a detail view representing a portion of a secondary valve mounted in a console and adapted to operate the secondary valve in the organ electrically. Fig. 6 represents the secondary valve in the organ as organized to be electrically operated from the console. Fig. 7 represents a draw-stop adapted to electrically operate a draw-stop valve from a console. Fig. 8 shows in detail a draw-stop valve mechanism in the organ adapted to be electrically operated by a draw-stop in the console. Fig. 9 is a detail view showing a means for making and breaking the draw-stop and draw-stop-valve circuits, to which reference will hereinafter be made. Figs. 10, 11, 12, and 13 are views to illustrate a modification of the cut-off valves separating the automatic and manual divisions from the secondaries of the playing divisions and varying from those shown and described in Figs. 1 to 4, inclusive, in that they are adapted to so separate the automatic mechanism and the division of the organ operated automatically from the manual section and the division of the organ operated manually that both may be played at the same time, one division automatically and the other division manually, and thus the manual playing be an accompaniment or a solo to the automatic, which may in its turn be an accompaniment or solo to the manual. Fig. 14 is an enlarged detail view in perspective to illustrate various channels, branches, diaphragm-valves and valve-chambers forming portions of the connections between the secondaries and the reed-boxes, hereinafter described. Fig. 15 is a view, enlarged, in vertical cross-section of the reed-box, showing a reed, reed-valve, channels, and branches.

We will now describe the invention in detail in conjunction with the drawings.

The organ is represented as having two banks of keys A A', (see Figs. 1 and 3,) by means of which it is manually played. A bellows (not shown) of any desired type or any other means may be employed for supplying the wind.

1 is a reservoir from which the wind is delivered or distributed to the main wind-trunks 2 and 3. They connect the reservoir with reed-boxes 4, and they also supply wind, by means of suitable connecting-conduits, to the wind-chamber 5 of the music-box, the wind-passage 6 of the primary pneumatics, the wind-passages 7 and 8 of the key primary valves, and the passages 9 and 10 of the secondary valves, and also the wind-passage 11 (see Figs. 2 and 3) of the stop-valve box, and also by the inlets 12 and 13 to the primary and secondary valves of the individualizing mechanism and by the inlet 14 to the pneumatic-to-manual valve. In addition there are the chambers common to the various stop-diaphragms of each set of reeds, there being two such chambers to each set of reeds and as many sets of reeds as may be desired. The wind for these stop-diaphragm chambers comes from the stop-valve box. The wind for supplying the cut-out diaphragm-chambers comes from the pneumatic-to-manual valve-box. The wind for the individualizing diaphragm-chamber and the accompaniment diaphragm-chamber comes from the secondary individualizing valve-box.

In Fig. 1, C represents the tracker-board partially contained in the music-chamber 5. It has the usual note-channels $c$ and the solo-note-governing channel $c'$, Fig. 3. The perforated music-sheet $c^2$ and its holding and winding spools $c^3$ $c^4$ are also contained in the chamber 5, and the music-sheet is drawn by the winding-roll over the ends of the tracker-board channels in the usual or in any desired way. The sheet has the usual perforations for governing the playing of the notes and an additional line of perforations governing the selection of the solo notes. The tracker-board has a channel $c$ for each note that is adapted to be played by the music-sheet and an additional single channel $c'$ for the single line of perforations in the music-sheet which governs the selection of individual notes.

Each of the note-channels $c$ is connected with a primary-pneumatic diaphragm D by the tube $z$. The note-governing channel $c'$ is connected by the tube $z'$ with a pneumatic-diaphragm of the valve D', (see Fig. 2,) which controls the operation of the individualizing diaphragm-valves $d$ and the accompaniment diaphragm-valves $d'$ (see Fig. 1) through the operation of the individualizing-valves $D^2$, $D^3$. (See Fig. 2.) The primary diaphragm-pneumatic D is operated when a note perforation in the music-sheet permits wind-pressure in the music-box chamber 5 to reach it. This wind impulse serves solely to move the diaphragm, and thus operate a valve in the pressure-passage 6, Fig. 1, to open a port between the passage and a vertical channel $d^2$, whereby wind from the passage 6 is admitted to the channel. The wind continues so long as the valve is open, and the valve is held open by the pneumatic-diaphragm so long as the perforation in the music-sheet allows pressure to pass from the chamber 5 to the pneumatic.

Each of the channels $d^2$ has an extension $d^3$, Fig. 3, horizontally arranged for the purposes of convenience. It is connected when permitted by the individualizing-diaphragm $d$ or the accompaniment-diaphragm $d'$ with either the individualizing-channel $d^4$ or the accompaniment-channel $d^5$, the diaphragms $d$ $d'$ being automatically controlled as to their action by the absence or presence of wind in their passages $d^6$ $d^7$, Figs. 1 and 3. The diaphragms $d$ govern the ports leading to the channels $d^3$ $d^4$, respectively, while the diaphragms $d'$ govern the ports leading to the channels $d^3$ $d^5$, respectively. (See Fig. 3.) The supply of wind to the passages $d^6$ $d^7$ is controlled through the respective tubular passages $z^2$ $z^3$ by the valves $D^3$ $D^2$, Fig. 2, which are in turn controlled by the valve $D'$ and in the following way:

The governing-channel $c'$ of the tracker-board is connected with the diaphragm-chamber of the primary valve $D'$, and when it takes wind from the chamber 5 it serves to operate the valve and admit wind by the supply-passage 12, through the tubular passage $z^4$, to the diaphragm-chamber of the valves $D^2$ $D^3$, whence the diaphragm $z^5$ is actuated and the valves moved. These valves are operated simultaneously and are so constructed that one admits wind to the accompaniment-passage $d^7$ or exhausts it of wind, while the other exhausts the solo-passage $d^6$ or provides it with wind, the wind being taken from the trunk through the passage 13 and alternately supplying the passage $d^6$ or $d^7$, according as the primary valve $D'$ is allowed to be actuated by the individualizing perforation and channel $c'$, or is held from operation by the closing of the channel. Normally the valve $D^3$, controlling the solo wind-passage $d^6$, is open to the wind and the solo-diaphragms thus held closed, while the valve $D^2$ is closed from the wind to exhaust the accompaniment-passage $d^7$, whereby the accompaniment-diaphragms $d'$ are free to operate in the playing of accompaniment notes.

When accompaniment notes are played, the individualizing primary pneumatic of the valve $D'$ is not actuated and the normal condition of the passages $d^6$ $d^7$ is that of wind in the solo-passage $d^6$ and of exhaust in the accompaniment-passage $d^7$. The wind is then free to pass from the channels of the tracker-board to the primary-pneumatic diaphragms to actuate the valves which permit wind to flow from the passage 6, as will hereinafter be explained, to the secondary pneumatics. When an individualizing note is to be played, the governing perforation of the music-sheet controlling the playing of the note permits wind to pass through the individualizing primary valve $D'$ and causes it to operate the individualizing-valves $D^2$ $D^3$, reversing the positions of each and admitting wind to the accompaniment-passage $d^7$ and exhausting the solo-passage $d^6$. This closes and holds closed the diaphragms $d'$ and releases the diaphragms $d$, permitting the channels $d^2$ $d^3$ to be connected with the individualizing-channels $d^4$ to play a solo note. The actuation of the primary pneumatic then causes wind to pass from the passage 6, through the channel $d^2$ $d^3$, under the diaphragm $d$, and into the individualizing-channel $d^4$. At this point we would say that the duration of the individualizing impulse thus obtained is sufficient to actuate a secondary pneumatic, but not sufficient to maintain it in position. It would otherwise be so quickly released that wind taken from another source is employed for holding the secondary pneumatic in its operative position during the continuance of the perforation in the music-sheet.

Up to this point the detailed description of our invention largely follows that of the corresponding parts of our said application. The individualizing-channels $d^4$ and the accompaniment-channels $d^5$ instead of being connectible at will with the secondaries of each of the three manuals, as therein described, are not connectible with both sets of the pneumatics of the secondary valves E E'. The individualizing-channels $d^4$ are connected only with the set of secondaries E, and the accompaniment-channels $d^5$ are connected only with the set of secondaries E'. The channels $d^4$ $d^5$, however, have cut-off valves like those described in our said application, and the secondaries are constructed to operate as therein set forth. Each of the individualizing-channels $d^4$ has a downward extension $e$, Fig. 4, below the line of its connection with its secondary, and each of the accompaniment-channels $d^5$ has an extension $e'$, Figs. 1 and 4, below the line of its connection with its secondary. These downward extensions $e$ $e'$ form the channels by which wind impulses from the key primaries reach the secondaries. The channels $d^4$ are adapted to be stopped from their secondaries E and the channels $d^5$ from their secondaries E' to cut out the automatic part of the organ from interference with the manual portion of it when it is desired to play the organ manually, and this is accomplished by means of the diaphragm-stops $E^2$ in the pressure-chamber $e^2$, the presence of pressure in the pressure-chamber causing the diaphragms to close the connections between the passages and their secondaries and the absence of pressure in the pressure-chambers permitting the wind impulses to pass the diaphragms. A similar diaphragm-chamber $e^3$, supplied with diaphragm-valve $E^3$, is employed for connecting or disconnecting the secondaries with the extensions $e$ $e'$, thus opening or closing the connections between the manual primary valves $a^2$ $a'$, respectively, and their secondaries. It will be understood that both of the pressure-chambers $e^2$ $e^3$ do not contain pressure at the same time, for wind-pressure is used in either chamber only when it is necessary to stop the connection between the automatic mechanism and the secondaries or the key primaries with the secondaries, chamber $e^2$ being used for the first purpose and the chamber $e^3$ for the second purpose. The admission and exhaust of pressure from these chambers preferably is controlled by a single draw-stop, although, of course, a draw-stop for each may be used. We have represented the single construction and for this purpose employ a double-acting valve $E^4$, Fig. 2, controlled by a single pneumatic $e^4$, actuated by wind from the stop-valve box 11 upon drawing the stop. A valve differing somewhat in construction from that illustrated, but performing the same functions, is fully described in our said application. The stop is called the "pneumatic-to-manual," and by drawing it pressure is admitted to the chamber $e^2$ and exhausted from the chamber $e^3$, thereby cutting out the automatic part of the organ and cutting in the manual part of it. By reversing the movement of the stop pressure is exhausted from the chamber $e^2$ and admitted to the chamber $e^3$, thus cutting in the automatic mechanism and cutting out the manual. This stop is adapted for use when the automatic and manual divisions are independently or successively played. To permit them to be simultaneously played, or so that a portion of the musical composition can be automatically played by the automatic division and a portion manually played upon the manual division, the stops are increased in number and arranged as represented in Figs. 10 to 13. Instead of then cutting out both sets of secondaries from either the automatic or manual division only one set is cut out from either, and this leaves one set of secondaries in operative relation with the automatic division and one set of secondaries in operative relation with the manual division. This will necessitate the use of additional draw-stops and the employment of a different arrangement of double-acting valves controlled thereby and the employment of two additional wind-pressure chambers, as each branch of the set of passages will not then be governed by a set of diaphragm-valves common to both, but separated by a solo cut-off chamber and an accompaniment-chamber with their respective diaphragm-valves.

The keys of the manual A operate the key-primaries $a'$, which control the supplying of wind impulses to the channel extensions $e'$. The keys of the manual A' operate the key-primaries $a^2$, controlling the admission of wind to the channels $e$, and this gives each set of secondaries its independent manual, which is used only in conjunction with it. Each set of secondaries is adapted to be connected at will with a single stop of reeds and in the following manner: Each secondary valve of both sets controls a separate reed-valve channel, each secondary valve E having a reed-valve channel $f$ and each secondary valve E' having the reed-valve channel $f'$. The reed-valve channels $ff'$ of the two secondaries for playing the same note extend side by side parallel with each other, and at each and every stop of reeds a branch channel connects each of these pairs of reed-valve channels with a single reed-valve for that note or reed of that stop. This reed-valve is common to both of the said branch channels, to the channels $ff'$, to a secondary valve E, and to a secondary valve E'.

In Figs. 4, 14, and 15 the channels $ff'$ are shown as connected with the valve-chamber of the reed-valve F by the branch passages $f^2 f^3$, each of which is controlled by a diaphragm-valve, (lettered, respectively, $f^4 f^5$.) The diaphragm-valves $f^4 f^5$ are contained in chambers $f^6 f^7$, the chamber $f^6$ being common to the diaphragm-valves $f^4$ and the chamber $f^7$ to the diaphragm-valves $f^5$, and wind is admitted or exhausted from said chambers by suitable draw-stops. Upon the drawing of a draw-stop the stop of reeds controlled by that stop is brought into operative connection with the secondaries. Each stop of reeds besides the draw-stop has two other draw-stops, one controlling the playing of notes by one set of secondaries and the other controlling the playing of notes by the other set of secondaries. Upon the drawing of a stop the wind in the chamber $f^6$ or $f^7$, which it controls and which has held the diaphragm-valves $f^4$ or $f^5$ of said chamber closed, is exhausted, and this permits the operation of the diaphragm-valves of that chamber and the operation of the reed-valves when so permitted by the secondaries which are then brought into operative connection with them. To permit this action to be better understood, we would say that the secondaries, except when operated by a note perforation or by a key, admit wind to the channels $ff'$. This wind, however, is held from reaching the reed-valves F by the diaphragm-valves $f^4 f^5$, which are held closed by wind in the chambers $f^6 f^7$ taken from another source and controlled by draw-stops.

To play a stop of reeds by either set of secondaries, it is first necessary to draw the draw-stop which controls either the diaphragm-valves $f^4$ and the diaphragm-valves $f^5$. This will exhaust pressure from said diaphragm valve-chamber and will then permit the wind in the channel $f$ or $f'$ to pass to the reed-valves F, so that the reed-valves F are then in the direct control of the secondaries connected with them. The operation of said secondaries by the perforations in the music-sheet or by the keys causes the channels $f$ or $f'$ to be exhausted. This removes pressure from the reed-valves F and permits the wind from the reed-box wind-chamber $x$ to pass under valve F through the reed-channels $x'$ to the reeds X and sound them. The reed-valve and its ports are like the reed-valve and ports of our pending application, to which reference has been made. To shut off a stop of reeds from the secondaries, the draw-stop which has been opened to exhaust pressure from the diaphragm valve-chambers $f^6$ or $f^7$ is closed. This admits wind to the chamber, but excludes it from the channels between the chamber and the reed-valves, so that the reed-valves are not then subjected to direct wind-pressure sufficient to maintain them closed as against wind-pressure in the reed-box wind-chamber. It therefore becomes necessary to release the pressure in the reed-box wind-chamber, as otherwise it would work its way past the reed-valves to the reeds and produce ciphering or a sounding of the reeds when the draw-stops controlling their action are not drawn. To prevent this occurring, the wind in the reed-box wind-chamber is exhausted simultaneously with the closing of the diaphragm draw-stop valves, and this is accomplished by locating at each end of the reed-box wind-chamber to each stop of reeds a valve G, which allows when open wind to flow into the chamber from the wind-trunk. Each of these valves is operated by separate pairs of pneumatics $G' G^2$ and $G^3 G^4$, respectively. The upper pneumatics at each end are connected directly with the upper stop-diaphragm pressure-chamber and the lower pneumatics with the lower diaphragm-stop pressure-chamber. When the draw-stop is drawn to exhaust the upper chamber, the pair of pneumatics connected with it is also exhausted simultaneously, and in this way the valves at each end of the wind-chamber are opened and when the stop is drawn to exhaust the lower chamber the pair of pneumatics connected with it are likewise exhausted simultaneously. The construction and operation of the pneumatics $G' G^2$ and $G^3 G^4$ and of the valve G are fully shown and described in our said application.

It will thus be seen that our present invention differs from that of our said specification largely because there is no grouping of stops into separate organs or divisions. In the construction of our said application solo and accompaniment effects could only be played upon a particular stop by connecting and using as solo and accompaniment the whole organ or division in which this stop was located. Then the stop drawn would play as desired; but necessarily the remaining stops being grouped with this one could not be played separately and would therefore be useless. Where an organ has three or more manuals, this is not necessarily undesirable; but in an organ of one or two manuals the stops are limited and the loss of any of them from this cause would be missed.

The present invention by the use of two draw-stops for each stop of reeds or pipes controlling chambers $f^6$ or $f^7$ enables the separate control of each stop for use either as solo or accompaniment when automatically played or for individual connection with either manual when manually played.

In the operation of the organ we will suppose the organist desires first to play the organ manually. By drawing the pneumatic-to-manual stop wind is cut off from the chamber 5 of the music-roll box, also exhausted from the chamber $e^3$ over and controlling the cut-off diaphragms in the secondary channel extension for connection with the key-primaries and is permitted to enter the chamber $e^2$ over and controlling the diaphragms in the secondary channel for the connection with the automatic primaries. Direct connection is thus made, when manually played, between the upper organ-manual A' and the set of secondaries E, that are controlled by the primaries $a^2$ of that manual only, and between the lower organ-manual A and the set of secondaries E', that are controlled by the primaries $a'$ of that manual only, and by disconnecting the channels from the automatic division of the organ interference is prevented from that source.

It will be seen that all the stop-diaphragms $f^5$, controlling the branch channels $f^3$, leading from the parallel channels $f'$, operated by the secondaries E', are located in a pressure-chamber $f^7$, common to all the notes of the same stop. Thus if pressure is taken from the chamber $f^6$, controlling the stop-diaphragm $f^4$ in the channel branches $f^2$, the reed-valves F of that stop will be allowed to operate by release of pressure through the secondaries E, while if pressure is released from the chamber $f^7$, controlling the stop-diaphragms $f^5$ in the channel branches $f^3$, the same reed-valves F of that stop will be allowed to operate by the release of pressure through the secondaries E'.

To play the organ automatically, the pneumatic-to-manual stop is pushed in, allowing pressure to the chamber 5 of the music-roll box for the operation of the automatic primary-valves D and opening connection with the same to the secondaries, while the key-primary extension is likewise discontinued. The solo-channel of the automatic division is now identical with a former key-primary channel and is therefore able to operate solely one set of secondaries, while the accompaniment-channel in turn operates the secondaries that were before governed by the other key primaries. Thus the one set of secondaries is changed to solo secondaries and the other set of secondaries is changed to accompaniment secondaries. The stop-action operates as before.

While we have herein generally referred to "stops" of reeds, we would say that the valve which controls the playing of a note by a reed can also be used for controlling the playing of a note by a pipe as well, and that the organization is therefore just as well adapted to pipe-organs as to reed-organs, and when we say "reed" in the specification and claims we mean it to include pipe as well.

Of course a single-manual organ may be constructed, if desired, by connection with one of the two sets of secondaries, the second set being only used for automatic solo individualizing.

The subbass stop of reeds has substantially the same construction as the other stops, but on account of the space it requires is placed below the secondaries. (See Fig. 1.) The valve construction is somewhat modified on account of the increase in its size required.

Each reed-box is supplied with a release or vent upon the closing of its valves G, similar to that described in our said application or of any usual construction.

Figure 12:
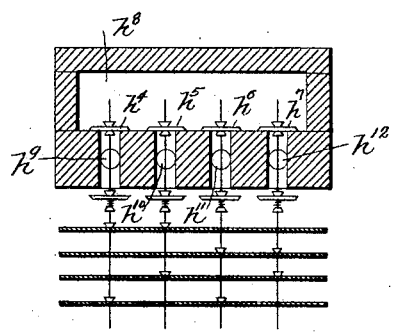
Figure 13:
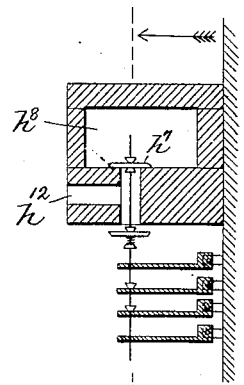

In Figs. 12 and 13 we have shown the stop-valves which are necessary when the organ is constructed for simultaneous automatic and manual playing. To understand this variation, it should be borne in mind that, as above described, both secondaries are either connected with the automatic playing mechanism at the same time or with the manual playing mechanism at the same time and there is no arrangement by which the automatic mechanism and the manual mechanism can be used together one upon one set of secondaries and the other upon the other. To accomplish a simultaneous or joint playing by both, whereby the automatic mechanism may be playing upon one set of secondaries while the manual mechanism may be used in connection with the other set of secondaries, we employ the structure of said figures, and it involves means whereby either set of secondaries may be connected with the automatic mechanism, while the other set at the same time may be connected with the manual mechanism, and also means whereby either set of secondaries may be alternated in such connection and so that both sets of secondaries may be either connected with the automatic mechanism or with the manual mechanism, as may be desired.

Figure 11:
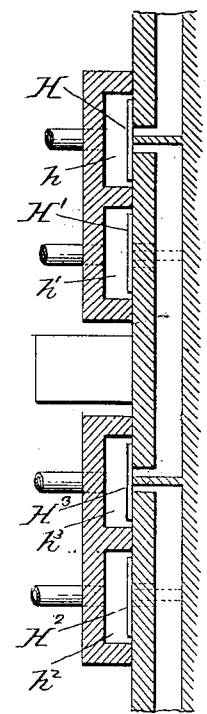

In Fig. 11, H represents the cut-off valves, which regulate the playing by the automatic mechanism of accompaniment notes upon the accompaniment secondaries, and H' the valves which regulate the playing by the automatic mechanism of solo notes upon the solo secondaries. $H^2$ shows the cut-off valves that regulate the manual playing of notes upon the solo secondaries, and $H^3$ shows the cut-off valves for regulating manually the playing of notes upon the accompaniment secondaries. $h$, $h'$, $h^2$, and $h^3$, respectively, are the wind-chambers controlling the operation of the cut-off valves and which themselves are controlled, respectively, by the stop-valves $h^4$, $h^5$, $h^6$, and $h^7$. These stop-valves are actuated by draw-stops and serve to admit pressure from the wind-pressure chamber $h^8$ to tubes or passages connecting, respectively, with the wind-chambers $h$, $h'$, $h^2$, and $h^3$ the stop-valve $h^4$, for instance, controlling the passage $h^9$ leading to the wind-chamber $h$, the stop-valve $h^5$ the passage $h^{10}$ leading to the wind-chamber $h'$, the valve $h^6$ the passage $h^{11}$ leading to the wind-chamber $h^2$, and the valve $h^7$ the passage $h^{12}$ leading to the wind-chamber $h^3$. According as these stop-valves are operated by their draw-stops to admit pressure to the wind-chambers or to exhaust pressure from them the secondaries are connected or disconnected with the automatic and the manual mechanism.

To play both secondaries automatically, the valves H H' must be relieved of pressure and the valves $H^2 H^3$ must be supplied with pressure in order that the manual connections therewith may be made inoperative or cut off from them, and this will necessitate the closing of valves $h^4 h^5$ from the wind and the opening of valves $h^6 h^7$ to the wind. To play the entire organ manually, only a reversal of these pressures and exhausts is necessary. The valves H H' are then subjected to pressure and serve to cut off both secondaries from the automatic mechanism, while the valves $H^2 H^3$ are relieved of pressure and permit both secondaries to be connected with and operated by the manual mechanism, and the valves $h^4 h^5$ are then opened to wind-pressure and the valves $h^6 h^7$ closed against it. To permit solo notes to be played by the automatic mechanism on the solo secondaries, while, if desired, accompaniment notes may be played upon the accompaniment secondaries manually, the cut-off valves H are supplied with pressure to cut off the accompaniment secondaries from the automatic mechanism, and the cut-off valves $H^3$, between the said secondaries and the manual mechanism, are relieved of pressure, thus allowing the manual mechanism to play accompaniment notes, and the cut-off valves H', between the solo secondaries and the automatic mechanism, are then relieved of pressure to permit them to be operated by the automatic mechanism, while the cut-off valves $H^2$, between the solo secondaries and the manual mechanism, are under pressure to close them from the manual mechanism. To permit accompaniment notes to be played automatically by the accompaniment secondaries and solo notes to be played manually by the manual mechanism, a reversal of the actions of these various valves is caused and the stop-valves for either effect are operated to admit pressure to the wind-chambers or to exhaust pressure therefrom, as may be necessary.

In Figs. 5 to 9, inclusive, we have shown a modified construction whereby a console, which occupies a position removed from the organ to any extent desired, may be used in playing the organ, and where the console is so located we prefer that a portion of our invention be located in the console and the remainder in the organ. We also prefer to use electric means, where the console is so used, for connecting the portion in the console with the portion in the organ. The console will then contain what may be considered the equivalents or equivalent parts for the portions of the secondaries termed the "pneumatics," while the organ itself will contain in addition to the parts which correspond to the valves of the secondaries additional valves, one for each secondary, which is electrically operated by the parts corresponding to the secondary pneumatics and contained in the console. The draw-stops in the console are electrically connected with the draw-stop valves, which are located in the organ by means of an intermediate electrically-operated valve in the organ. When this electrical connection is employed, the draw-stop-valve mechanism differs from that which we have already described. I, Fig. 5, corresponds to the pneumatic of either secondary valve E E' in that it receives operating wind impulses either from the automatically-actuated mechanism or the manually-operated mechanism, as above described, to operate either of the divisions and to play either an accompaniment or a solo note. The electric mechanism receiving the impulse from the diaphragms I both in the console and in the organ is like the mechanism which has been heretofore used in electrically-connected organs; but our use of it varies in that it is employed to transfer from the console to the organ either an accompaniment note or a solo note, according as the actuating pneumatic may be operated and either automatically played or manually played. $i$, Fig. 6, corresponds to a secondary valve of the division controlling the admission and exhaust of air to a reed-valve channel. The valve $i$ is operated by a pneumatic $i'$, and pressure is admitted to or exhausted from the pneumatic chamber $i^2$ by means of the armature-valve $i^3$, and this valve is of usual construction and is electrically connected with the contact $i^5$ of the console and is operated by the movement of the secondary pneumatic I of the console through a contact $i^6$ operated by it, which causes the armature-valve magnet to be energized.

In Fig. 7 we have represented a portion of an electric draw-stop mounted upon the console and which is of ordinary construction and adapted to make or break a circuit between the console and draw-stop valves in the organ. One set of these valves is represented in Figs. 8 and 9.

J is the wind-chamber from the wind-trunks for supplying wind to the stop-valve $j'$.

$j$ is a passage connecting with the stop-valves and affording means whereby they are supplied with pressure or exhaust, and the valve-chamber and passage correspond to what we have already described. To operate the valve $j'$ electrically from the electric draw-stop $j^2$ of the console, we prefer to use a construction which will cut off the electric impulse as soon as a stop-valve has been operated, and this result is secured by means of the armature-valve $j^3$, which controls admission of pressure to the pneumatic chamber $j^4$ of a pneumatic $j^5$. This pneumatic controls the valve $j^6$ of a wind-inlet port $j^7$, between the wind-chamber $j^8$ and the channel $j^9$ to an auxiliary pneumatic $j^{10}$, which serves two purposes, one to keep the valve $j'$ open and the other to break the actuating electric circuit and transpose it to a circuit to be operated by a reverse movement of the draw-stop.

Suppose the draw-stop to have been drawn and the electric armature-valve $j^3$ to have been operated. The valve $j^6$ is open, and wind enters the channel $j^9$ and pneumatic $j^{10}$, which being filled operates against the valve-stem $j^{11}$ of the valve $j'$, lifting it, and thereby permitting pressure from the chamber J to pass to the channel $j$. As the channel $j$ is also connected with the channel $j^9$, back pressure is at the same time supplied the pneumatic $j^{10}$, which so long as the channel $j^9$ is otherwise closed to outer air acts to sustain or hold inflated the pneumatic $j^{10}$ and the valve $j'$ opened to the chest or wind-chamber J, and as the pneumatic $j^{10}$ carries a circuit-breaker which breaks the electric connection from the draw-stop $j^2$ and which also permits one to be made when the draw-stop $j^2$ is reversed with another armature-valve which serves to operate the valve $j^{12}$, controlling the exhaust-port $j^{13}$ of the channel $j^9$, it follows that upon the inflation of the pneumatic to operate the valve $j'$ the armature-valve $j^8$ becomes inoperative and that this effects the closing of the valve $j^6$, so that the pneumatic no longer receives pressure from the chamber $j^8$ and only from the channel $j$. This, however, is sufficient to keep the pneumatic distended and the valve $j'$ open until the movement of the draw-stop has been reversed, when an electric circuit is established which operates an armature-valve like the armature-valve $j^3$, but not shown, but which controls the operation of the exhaust-valve $j^{12}$ in the same way in which the valve $j^6$ is operated and which then serves to open the exhaust and permit the escape of the wind from the pneumatic $j^{10}$, the exhaust-port being larger in area than the by-passage connecting the channel $j$ with the pneumatic, and thus enabling wind to escape more rapidly than it can be supplied and the pneumatic to close. This closing of the pneumatic $j^{10}$ then effects a reversal of the electric connection above referred to, breaking that between the draw-stop and the second armature-valve, to which we have referred, and making possible the initial operation which we have already described. It will be understood that the operation of the other draw-stop valves is like the one described and that the others need not be further referred to.

Fig. 9 is a view in end elevation of the pneumatic $j^{10}$, showing its circuit-breaker. It comprises three contact-wires of varying heights arranged near the movable end of the pneumatic and with which a circuit-making plate carried by the pneumatic is adapted to establish connection according to the position of the plate. When the pneumatic is closed, the plate is in its lowest position, and electrical connection is then established between the central wire, which is the battery-wire, with the shortest wire, which permits the establishment of a circuit through the magnet governing the inflation of the pneumatic when its draw-stop is drawn. The other circuit is established when the pneumatic is inflated, and the plate makes connection between the central wire and the higher wire, which is bent inward at its upper end to permit contact with it to be made after the plate has cleared the top of the shorter wire. This permits the establishment of an electric circuit with a magnet to return the pneumatic to its normal position when the draw-stop has been reversed or pushed in.

Having thus fully described our invention, we claim and desire to secure by Letters Patent of the United States—

1. In a musical instrument of the kind described, the combination of a stop of reeds, a valve for each note of said stop to control its playing, a group of secondary pneumatics for each of said valves, a channel individual to each secondary of each group connecting each of said valves with its group of secondaries, and means for supplying pressure to the reeds and to the secondaries.

2. In a musical instrument of the kind described, the combination of a number of stops of reeds differing as to their respective qualities, a valve for each note of all the said stops to control its playing, a group of secondary pneumatics common to the same valves of all the stops of reeds, a channel individual to each secondary of each group, connecting each of said valves of each of the stops of reeds with its group of secondaries, and means for supplying pressure to the stops of reeds and to the secondaries.

3. In a musical instrument of the kind described, the combination of sound-producing devices, a valve for each note of said sound-producing devices to control its playing, a group of secondary pneumatics for each of said valves, a channel individual to each secondary of each group, connecting each of said valves with its group of secondaries, and means for supplying pressure to the secondaries.

4. In a musical instrument of the kind described, the combination of a number of sound-producing devices differing as to their respective qualities, a valve for each note of all said sound-producing devices to control its playing, a group of secondary pneumatics common to the same valves of all the sound-producing devices, a channel individual to each secondary of each group, connecting each of said valves of each of the sound-producing devices with its group of secondaries, and means for supplying pressure to the secondaries.

5. In a musical instrument of the kind described, the combination of a number of sound-producing devices differing as to their qualities, a valve for each note of all the sound-producing devices to control its playing, a group of secondary pneumatics common to the same valves of all the sound-producing devices, a channel individual to each secondary of each group, connecting each of said valves of each of the sound-producing devices with its group of secondaries, stops for said channels, and means for supplying pressure to the secondaries.

6. In a musical instrument of the kind described, the combination of a stop of reeds, a valve for each note of said stop to control its playing, a group of secondary pneumatics for each of said valves, a channel individual to each secondary of each group, connecting each of said valves with its group of secondaries, a stop for each channel, and means for supplying pressure to the reeds and to the secondaries.

7. In a musical instrument of the kind described, the combination of a number of stops of reeds differing as to their respective qualities, a valve for each note of all the said stops to control its playing, a group of secondary pneumatics common to the same valves of all the stops of reeds, a channel individual to each secondary of each group, connecting each of said valves of each of the stops of reeds with its group of secondaries, a stop for each channel, and means for supplying pressure to the stops of reeds and to the secondaries.

8. In an organ, the combination of a stop of reeds, a valve controlling the playing of each note of said stop, two or more secondary pneumatics for controlling each valve and automatic means for operating the secondaries.

9. In an organ, the combination of a stop of reeds, a valve controlling the playing of each note of said stop, two or more secondary pneumatics for controlling each valve and manual means for operating the secondaries.

10. In a musical instrument of the kind described, the combination of a stop of reeds, a valve controlling the playing of each note of said stop, a group of two or more secondary pneumatics for controlling each of said valves, automatic means for producing wind impulses available for either accompaniment or individualizing purposes, and further means for selecting and separating said accompaniment and individualizing impulses and for operating the secondaries thereby.

11. In a musical instrument of the kind described, the combination of a stop of reeds, a valve controlling the playing of each note of said stop, two or more secondary pneumatics for controlling each of said valves, automatic means for producing wind impulses available for either accompaniment or individualizing purposes, further means for selecting and separating said accompaniment and individualizing impulses and for operating the secondaries thereby, and stops for governing the operation of the secondaries whereby said valves may be operated to cause the playing of individualizing notes by one secondary of a group, the same valves also operated to permit the playing of accompaniment notes by another of said group of secondaries.

12. In a musical instrument of the kind described, the combination of a number of stops of reeds, a valve for each note of all said stops to control its playing, a group of secondary pneumatics common to the same valves of all the stops of reeds and controlling the playing thereof, automatic means for producing wind impulses available for either accompaniment or individualizing purposes, and further means for selecting and separating said accompaniment and individualizing impulses and for operating the secondaries thereby.

13. In a musical instrument of the character specified, the combination of a number of sound producing devices, a valve controlling the playing of each note of all said sound-producing devices, two secondary pneumatics for controlling the playing of each valve, and automatic means connected with said secondary pneumatics to operate one set of them to actuate the valves for the playing of individualizing notes and to operate the other set of secondary pneumatics to actuate the same valves in the playing of accompaniment notes.

14. In an organ, the combination of a number of stops of reeds, a valve controlling the playing of each note of said stops, two secondary pneumatics for controlling each valve of the stop playing the same note, primary pneumatics controlling impulses for operating the secondary pneumatics, and means between the primary pneumatics and the secondary pneumatics whereby said impulses for controlling the secondary pneumatics are automatically separated into two groups, one of which actuates one set of secondary pneumatics and the other of which actuates another set of secondary pneumatics.

15. In a musical instrument of the character specified, the combination of a number of stops of reeds differing as to their respective qualities, a valve for each note of all the said stops to control its playing, a group of secondary pneumatics common to each valve of the same note of all the stops of reeds and controlling the operation of said valves, a manual connected with one line of secondaries to operate them, and a manual connected with the other line of secondaries to operate them.

16. In a musical instrument of the character specified, the combination of a number of stops of reeds, a valve for each note of all the said stops to control its playing, a group of secondary pneumatics common to each valve of the same note of all the stops of reeds and controlling the playing of said valves, automatic means for actuating said secondaries, and manual means for actuating said secondaries.

17. In a musical instrument of the character specified, the combination of a number of stops of reeds differing as to their respective qualities, a valve for each note of all the said stops to control its playing, a group of secondary pneumatics common to each valve of the same note of all the stops of reeds, automatic means for producing wind impulses available for either accompaniment or individualizing purposes, further means for selecting and separating said accompaniment and individualizing impulses and for operating the secondaries thereby, and manuals, one of which is connected with one secondary of each group of secondaries to actuate them and the other of which is connected with the other secondary of each group of secondaries to actuate them.

18. In an organ, the combination of primary and secondary pneumatics of the character specified, intermediate means whereby the sheet governs the operation of the primary pneumatics to control impulses which operate the secondary pneumatics, means between the primary pneumatics and the secondary pneumatics to separate the impulses into two divisions and to cause one division to actuate one set of secondary pneumatics and the other division to actuate a second set of pneumatics, a number of stops of reeds and a valve for each note of all the said stops to control its playing, which valve is controlled by two secondaries, one of each set.

19. In a musical instrument of the character specified, the combination of two manuals, a primary pneumatic for each key of each manual, two sets of secondary pneumatics, one of which is operated by the primary pneumatics of one and the other of which is operated by the primary pneumatics of the other manual, a number of stops of reeds differing as to their respective qualities, and a valve for each note of all the said stops to control its playing and controlled by two secondary pneumatics, one from each manually-actuated set.

20. In a musical instrument of the character specified, the combination of valves controlling the playing of notes, two or more sets of independent valve-controlling means, each of which controls the actuation, independently of the other, of all the said valves, automatic means governing the independent operations of said sets of independent valve-controlling means, for causing one of said sets to permit valves to play solo notes and another set to permit valves to play accompaniment notes, an individual manual for each set of valve-controlling means, exclusive to it, and devices for connecting one set of valve-controlling means with the means for automatically governing its operation and for disconnecting the other set therefrom and for connecting it with its manual, whereby one set of said valve-controlling means may be automatically operated to cause the valves to play either solo or accompaniment notes, while the manual may be operated to cause another set of valve-controlling means to be actuated to cause the valves to be hand-governed.

21. The combination in a musical instrument of the character specified of a number of sound-producing devices differing as to their respective qualities, a valve for each note of all the said sound-producing devices and controlling its playing, a group of secondary pneumatics common to each valve of the same valves of all the sound-producing devices and controlling the playing of said valves, automatic means for producing wind impulses available for either accompaniment or individualizing purposes, further means for selecting and separating said accompaniment and individualizing impulses and for operating the secondaries thereby, a manual for operating one secondary of each group and another manual for operating the other secondary of the said groups, the said secondaries being adapted to be manually and automatically operated at the same time.

22. In an organ, the combination of a stop of reeds, a valve controlling the playing of each note of said stop, secondary pneumatics for each valve of all the stops playing the same note, automatic means for operating said secondaries, a second set of secondaries connected with the same valves, and manual means for operating them.

23. In an organ, the combination of valves governing the playing of notes, two sets of valve-controlling means, each of which is independent of the other and each of which controls the playing of all the valves, and means for automatically governing the opertion of both sets of valve-controlling means and causing one set of said valve-controlling means to permit the actuation of the valves to play solo notes and the other set of said valve-controlling means to permit the actuation of the valves in playing accompaniment notes.

24. The combination in a musical instrument of the character specified of a number of stops of reeds, a valve for each note of all the said stops of reeds and controlling its playing, a group of secondary pneumatics common to each valve of the same note of all the stops of reeds, connections between each group of secondaries and said valves of the same note, comprising two main channels and a branch passage from each channel to the valve for each stop, a stop-valve for each of said branches, and suitable draw-stops for controlling them.

25. The combination in a musical instrument of the character specified of a number of stops of reeds, a valve for each note of all the said stops of reeds and controlling its playing, a group of secondary pneumatics common to each valve of the same note of all the stops of reeds, connections between each group of secondaries and said valves of the same note, comprising two main channels and a branch passage from each channel to the valve for each stop, a stop-valve for each of said branches, suitable draw-stops for controlling them, automatic means for producing wind impulses available for either accompaniment or individualizing purposes, and further means for selecting and separating said accompaniment and individualizing impulses and for operating the secondaries thereby.

26. The combination in a musical instrument of the character specified of a number of stops of reeds, a valve for each note of all the said stops of reeds and controlling its playing, a group of secondary pneumatics common to each valve of the same note of all the stops of reeds, connections between each group of secondaries and said valves of the same note, comprising two main channels and a branch passage from each channel to the valve for each stop, a stop-valve for each of said branches, suitable draw-stops for controlling them, automatic means for producing wind impulses available for either accompaniment or individualizing purposes, further means for selecting and separating said accompaniment and individualizing impulses and for operating the secondaries thereby, and manuals one of which is connected with one secondary of each group of secondaries to actuate them and the other of which is connected with the other secondary of each group of secondaries to actuate them.

27. The combination in a musical instrument of the character specified of a reed, a reed-valve, a reed-box wind-chamber, a passage extending from the chamber to the reed controlled by the valve, two independent means for actuating the valve, and a stop-valve for each of said means and for the reed-box wind-chamber adapted to be simultaneously operated to shut off wind or pressure from each side of the reed-valve.

28. The combination in a musical instrument of the character specified of a number of stops of reeds, a valve for each note of all the said stops of reeds and controlling its playing, a group of secondary pneumatics common to each valve of the same note of all the stops of reeds, connections between each group of secondaries and said valves of the same note, comprising two main channels and a branch passage from each channel to the valve for each stop, a stop-valve for each of said branch passages and suitable draw-stops for controlling them, automatic means for producing wind impulses available for either accompaniment or individualizing purposes, further means for selecting and separating said accompaniment and individualizing impulses and for operating the secondaries thereby, manuals one of which is connected with one secondary of each group of secondaries to actuate them and the other of which is connected with the other secondary of each group of secondaries to actuate them, and stops for connecting and disconnecting the automatic means and the manuals with the secondaries.

29. The combination in a musical instrument of the character specified of a number of stops of reeds, a valve for each note of all the said stops of reeds and controlling its playing, a group of secondary pneumatics common to each valve of the same note of all the stops of reeds, connections between each group of secondaries and said valves of the same note, comprising two main channels and a branch passage from each channel to the valve for each stop, a stop-valve for each of said branches and suitable draw-stops for controlling them, automatic means for producing wind impulses available for either accompaniment or individualizing purposes, further means for selecting and separating said accompaniment and individualizing impulses into two divisions, one of which operates one secondary of each group to play individualizing notes and the other of which operates the other secondary of each group to play accompaniment notes.

30. In a musical instrument of the character specified, the combination of a number of stops of reeds differing as to their respective qualities, a valve for each note of all the said stops of reeds to control its playing, a group of secondary pneumatics common to the same valve of all the stops of reeds, automatic means for producing wind impulses available for either accompaniment or individualizing purposes, further means for selecting and separating said accompaniment and individualizing impulses into two divisions, one of which operates one secondary of each group to play individualizing notes on all the notes of all the stops of reeds and the other of which operates the other secondary of each group to play accompaniment notes upon all the notes of all the stops of reeds.

JAMES CLARKE HAGEY.
    OLIVER H. ARNO.

Witnesses:
 F. F. RAYMOND, 2d,
 J. E. R. HAYES.